United States Patent [19]
Yamamoto et al.

[11] Patent Number: 5,693,218
[45] Date of Patent: Dec. 2, 1997

[54] APPARATUS FOR DISCHARGE SURFACE LIQUID

[75] Inventors: Hideo Yamamoto; Mitsuo Yamamoto, both of Fukuyama, Japan

[73] Assignee: Kowa Kikai Sekkei Kogyo Kabushiki Kaisha, Hiroshima-Ken, Japan

[21] Appl. No.: 927,953

[22] Filed: Aug. 11, 1992

[30] Foreign Application Priority Data

Jun. 22, 1992 [JP] Japan .................. H4-162989

[51] Int. Cl.⁶ .................................................. C02F 1/40
[52] U.S. Cl. ...................... 210/122; 210/242.3; 210/540; 210/923
[58] Field of Search .................. 210/122, 241.1, 210/242.3, 923, 538, 540

[56] References Cited

U.S. PATENT DOCUMENTS

| | | | |
|---|---|---|---|
| 3,395,803 | 8/1968 | Sumimoto et al. | 210/122 |
| 3,442,385 | 5/1969 | Nash | 210/122 |
| 3,633,749 | 1/1972 | Panosh | 210/923 |
| 3,782,553 | 1/1974 | Brekke | 210/243.3 |
| 3,853,767 | 12/1974 | Mohr | 210/923 |
| 3,853,768 | 12/1974 | Bagnuio | 210/923 |
| 4,301,008 | 11/1981 | Baffert | 210/242.3 |
| 5,059,312 | 10/1991 | Galletti | 210/122 |
| 5,104,528 | 4/1992 | Christie | 210/122 |

*Primary Examiner*—Christopher Upton
*Attorney, Agent, or Firm*—Ladas & Parry

[57] ABSTRACT

A base fixed to a liquid-containing tank and a float disposed above the base are liquid-tightly secured to lower and upper ends, respectively, of a flexible member comprising a bellows cylinder. The base, the float and the flexible member define a liquid reservoir. The float rises when there is a large quantity of liquid in the reservoir and falls when there is a small quantity of liquid in the reservoir, so that a damming plate provided on the float is moved above and below the surface of the liquid in the tank. When the damming plate is moved below the liquid surface, the liquid on the surface flows into the reservoir through a liquid inlet formed in the float, and the liquid that collects in the reservoir is discharged to the exterior of the tank by a liquid discharge pipe. As the float rises, the damming plate is lifted above the surface of the liquid in the tank, thereby cutting off the flow of surface liquid into the reservoir. This operation is performed repeatedly to remove the surface liquid from the tank.

3 Claims, 6 Drawing Sheets

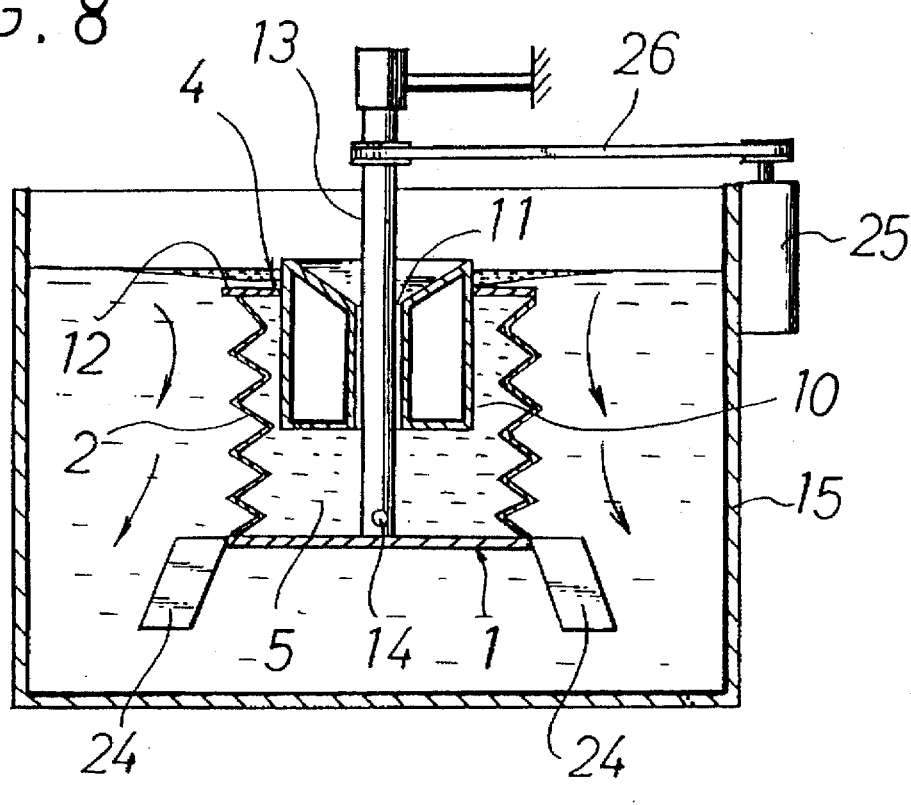
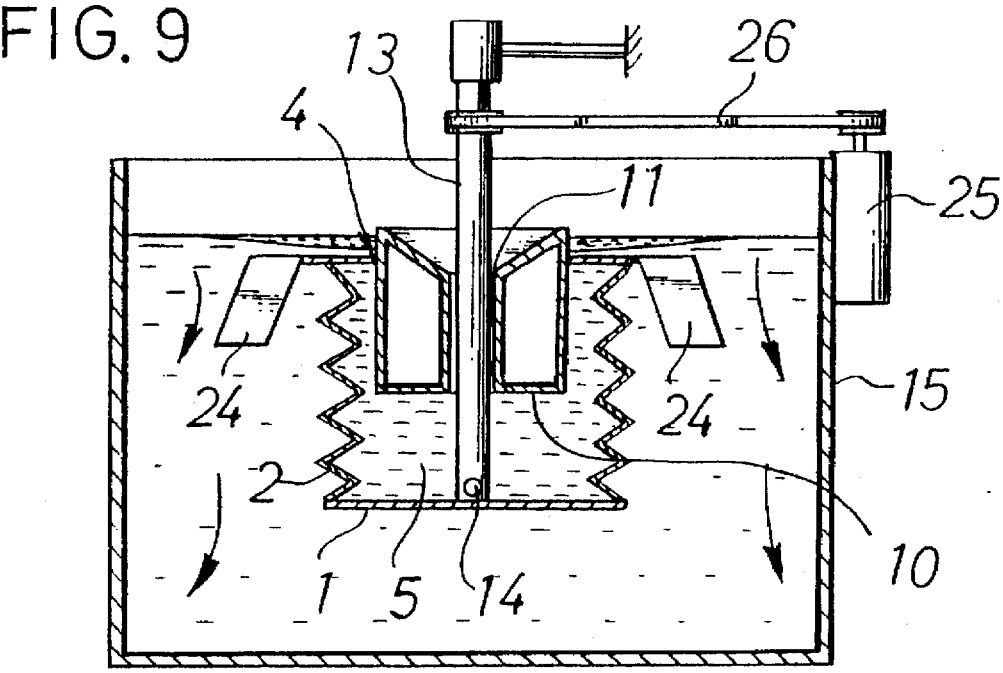

APPARATUS FOR DISCHARGE SURFACE LIQUID

BACKGROUND OF THE INVENTION

1. Field of the Invention

This invention relates to a surface-liquid discharge apparatus for discharging a surface liquid containing machine oil or the like that floats to the surface of a liquid such as a cutting solution owing to a difference in specific gravity, thereby eliminating the surface liquid from the liquid such as the cutting solution.

2. Description of the Prior Art

A surface-liquid discharge apparatus of the type mentioned above is disclosed in the specification of Japanese Patent Publication (KOKOKU) No. 61-59994, by way of example. In the apparatus disclosed, a damming plate is supported in a vertically slidable manner on the inner peripheral surface of the upper part of a casing secured inside a tank, the lower part of a float fixed to the damming plate is accommodated within the casing, and the bottom of the casing opens to a discharge pipe.

When the amount of liquid in a liquid reservoir within the casing is small, the lift acting upon the float is small and therefore the damming plate sinks below the surface of the liquid inside the tank, thereby allowing the liquid on the surface of this liquid to flow into the liquid reservoir from the upper edge of the damming plate. The surface liquid that has flowed into the reservoir is discharged to the exterior of the tank through the discharge pipe by driving a pump or the like.

During the course of this operation, the amount of liquid which flows into the liquid reservoir from the upper edge of the damming plate becomes greater than the amount of liquid discharged from the discharge pipe, as a result of which the amount of liquid which accumulates in the liquid reservoir gradually increases and the level of the liquid in the reservoir rises. Consequently, the lift acting upon the float increases, the float rises and the damming plate is made to project into the liquid inlet port of the casing and protrude from the surface of the liquid, thereby interrupting the discharge of the surface liquid inside the tank.

If the discharge of the surface liquid from the discharge pipe is continued under these conditions, the amount of liquid which has accumulated in the liquid reservoir decreases, the damming plate descends along with the float and the surface liquid begins flowing in again over the upper edge of the damming plate. Discharge of the surface liquid is carried out by repeating this operation.

In the conventional surface-liquid discharge apparatus described above, the liquid inlet port, which is a cut-away portion or the like formed in the side wall of the casing that opposes the damming plate, has a lower edge that is situated below the surface of the liquid at all times. As a result, the liquid leaks from the inlet port into the liquid reservoir through the space between the casing and the damming plate. Since the amount of liquid leakage is large, the time during which the flow of surface liquid into the liquid reservoir is interrupted by lifting of the float is lengthened, and the leaking liquid contains a large percentage of liquid other than the surface liquid, namely liquid which is not desired to be discharged. Accordingly, a problem which arises is that the surface liquid cannot be discharged efficiently.

SUMMARY OF THE INVENTION

Accordingly, an object of the present invention is to provide a surface-liquid discharge apparatus in which liquid other than a surface liquid is prevented from leaking into a liquid reservoir, thereby making it possible to discharge the surface liquid from the interior of the liquid reservoir very efficiently.

According to the present invention, the foregoing object is attained by providing an apparatus for discharging a surface liquid, comprising a base arranged in a liquid, a flexible member comprising a bellows or diaphragm having one end fixed to the base at an outer peripheral portion thereof, a float disposed above the base and having an outer peripheral portion fixed to another end of the flexible member, a liquid reservoir formed in a space delimited by the base, the flexible member and the float for receiving a surface liquid which flows in from a liquid inlet provided in the float, a damming plate provided on the outer peripheral portion of the float for being moved above and below the level of the liquid by ascent and descent of the float, and a liquid discharge pipe open to the interior of the liquid reservoir for discharging the surface liquid inside the liquid reservoir to the exterior of the liquid.

In the operation of the apparatus, the float rises and falls with an increase and decrease in the amount of liquid inside the liquid reservoir defined by the base, the flexible member and the float. Whenever the float descends, the damming plate moves below the level of the liquid in a tank or the like, thereby allowing the liquid on the surface to flow into the liquid reservoir through the liquid inlet. The liquid inside the reservoir is discharged to the outside, such as to the outside of the tank, by means of the liquid discharge pipe.

Since the upper and lower ends of the flexible member are fixed to the outer peripheral portions of the base and float, respectively, leakage of liquid other than the liquid on the surface into the liquid reservoir can be prevented by making the joints between the flexible member and the base and float water-tight. Accordingly, the percentage of liquid other than the surface liquid that enters the liquid reservoir can be reduced, and the time during which the flow of surface liquid into the liquid reservoir is interrupted by ascent of the float is shortened, thereby making it possible to discharge the surface liquid to the outside in a highly efficient manner.

The present invention exhibits a number of outstanding effects, which will now be described.

The float rises when there is a large quantity of liquid in the liquid reservoir and falls when there is a small quantity of liquid in the liquid reservoir, which is defined by the base, the flexible member and the float. Whenever the float descends, the damming plate moves below the surface of the liquid in a tank or the like, and the liquid on this surface flows into the reservoir through the liquid inlet. The liquid which collects in the reservoir is discharged to the exterior of the tank by the liquid discharge pipe.

Since the upper and lower ends of the flexible member are fixedly secured to the base and the outer circumferential portion of the float, leakage of liquid other than the surface liquid into the liquid reservoir can be prevented reliably by making the joints where the flexible member is secured to the base and float water-tight. Accordingly, the percentage of liquid other than the surface liquid that flows into the reservoir can be reduced, and the time during which the flow of surface liquid into the interior of the liquid reservoir is cut off by lifting of the float can be shortened, thereby making it possible to discharge the surface liquid to the exterior in an efficient manner.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a longitudinal sectional view illustrating a sixth embodiment of a surface-liquid discharge apparatus according to the present invention;

FIG. 9 is a longitudinal sectional view illustrating a seventh embodiment of a surface-liquid discharge apparatus according to the present invention.

DESCRIPTION OF THE PREFERRED EMBODIMENTS

Preferred embodiment of the present invention will now be described in detail with reference to the accompanying drawings.

Figure 1:
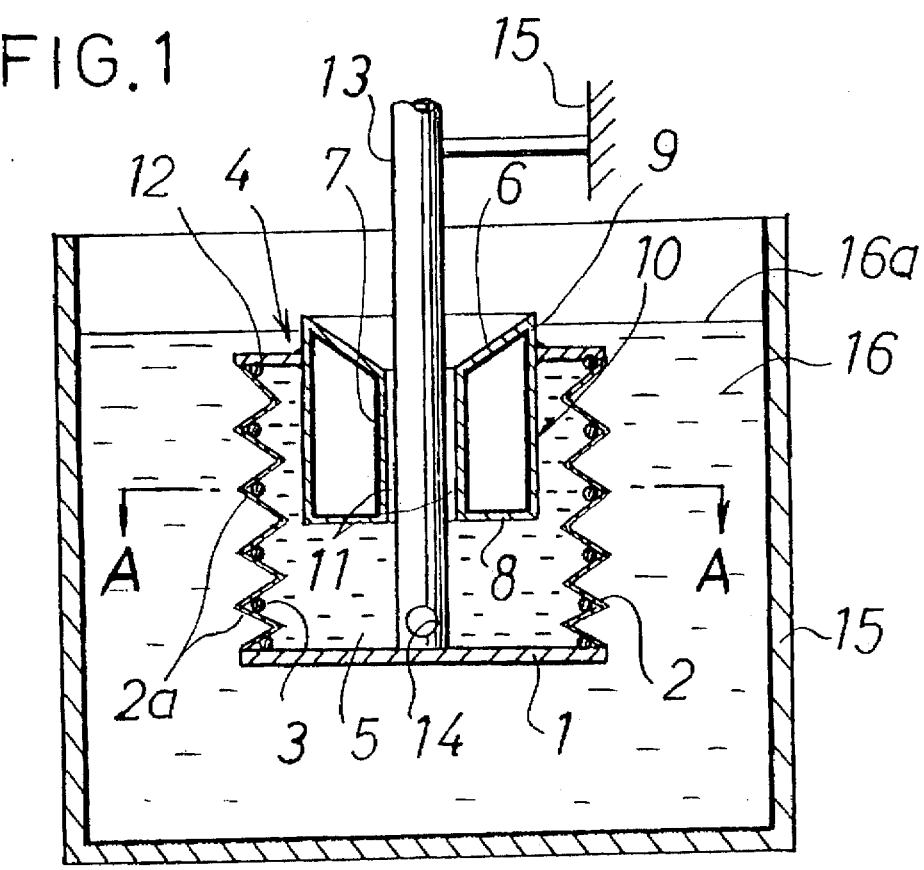
FIG. 1 is a longitudinal sectional view illustrating a first embodiment of a surface-liquid discharge apparatus according to the present invention.
Figure 2:
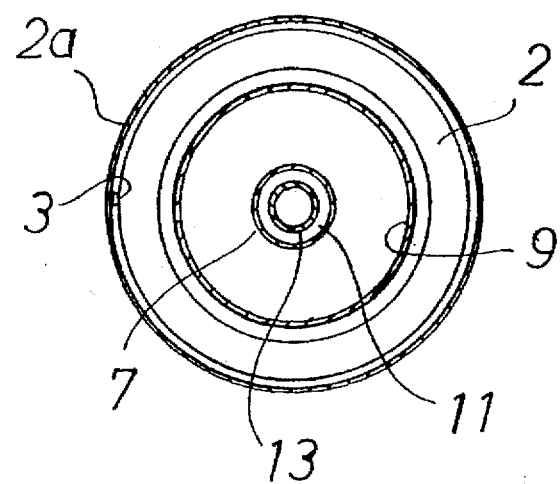
FIG. 2 is a sectional view taken along line A—A of FIG. 1.

FIGS. 1 and 2 illustrate a first embodiment of an apparatus for discharging surface liquid in accordance with the present invention. As shown in FIGS. 1 and 2, the apparatus includes a disk-shaped base 1 having an outer peripheral portion to the upper side of which is affixed the lower end of a flexible member 2 capable of expanding and contracting and comprising a bellows cylinder made of synthetic resin, metal plates or the like. The flexible member 2 has an outer-diameter portion 2a formed as a number of vertically arrayed stages or as a continuous helix. The outer-diameter portion 2a is supported by supporting means 3, namely a number of vertically arrayed rings or a coil spring engaging therewith.

The upper end of the flexible member 2 is secured to the outer peripheral portion of a float 4, described below. The float 4 is disposed above the base 1. The supporting means 3, namely the rings at the upper and lower ends of the bellows, or the upper and lower ends of the coil spring, is supported by the base 1 and the float 4. The base 1, the flexible member 2 and the float 4 delimit an interior space which forms a liquid reservoir 5.

The float 4 has a float body 10 which includes an upper wall 6, an inner circumferential wall 7 whose upper end is fixedly secured to the inner circumferential portion of the upper wall 6, a lower wall 8 whose inner circumferential portion is fixedly secured to the lower end of the inner circumferential wall 7, and an outer circumferential wall 9, which serves also as a damming plate, whose upper and lower ends are fixedly secured to the outer circumferential portions of the upper wall 6 and lower wall 8, respectively. Thus, the float body 10 comprises a hollow body in the form of a double cylinder constructed by the walls 6, 7, 8 and 9. The upper wall 6 of the float body 10 defines a smoothly inclined or step-shaped funnel-like configuration the outer circumferential side of which is higher than the inner circumferential side.

A liquid inlet 11 is formed at the center of the inner circumferential wall. The liquid inlet 11 has an upper end open above the upper wall 6, and a lower end open to the liquid reservoir 5. The outer peripheral surface of the outer circumferential wall 9 serving as the damming plate of float body 10 has a protruding mounting ring 12 provided at a suitable location along the vertical direction. The upper end of the flexible member 2 is fixedly secured to the mounting ring 12.

A liquid discharge pipe 13 is passed through the liquid inlet 11 leaving a clearance between it and the inner circumferential wall 7 of the float body 10, the lower end of the liquid discharge pipe 13 is secured to the upper surface of the base 1 at the central part thereof, and the lower end of the liquid discharge pipe 13 is formed to have a discharge port 14, which opens to the interior of the liquid reservoir 5, at a plurality of locations in the circumferential direction. The upper end of the liquid discharge pipe 13 protruding from above the float 4 is supported on and secured to a tank 15 by suitable means and is connected to the intake side of a pump (not shown). Though not illustrated, an oil-liquid separating tank is connected to the discharge side of the pump.

The base 1 is fixed in a suspended state at a prescribed height in the tank 15 by the liquid discharge pipe 13, and the upper edge of the damming outer circumferential wall 9 of float 10 is disposed at a height at which it will be moved above and below the liquid level 16a of a liquid 16 in the tank 15 owing to the ascent and descent of the float 4.

The operation of the first embodiment constructed as set forth above will now be described for a case where the apparatus is applied to removal of machine oil floating on the surface of a cutting liquid of a machine tool.

When there is comparatively little liquid inside the liquid reservoir 5 in the space defined by the base 1, flexible member 2 and float 4, the lift of buoyancy which acts upon the float body 10 of float 4 is small, and therefore the float 4 descends under the force of gravity so that the upper end of the outer circumferential wall 9 serving also as a damming plate is situated slightly below the level 16a of the liquid 16 inside the tank 15. As a consequence, the liquid on the surface of the cutting liquid, namely the liquid 16 in the tank 15, which surface liquid contains a large amount of machine oil mixed in with and floating on the cutting liquid, flows over the upper edge of the damming outer circumferential wall 9 and flows into the liquid reservoir 5 via the upper wall 6 of the float body 10 and the liquid inlet 11.

The surface liquid which has flowed into the liquid reservoir 5 is sucked up from the discharge port 14, which is provided in the lower end of the liquid discharge pipe 13, by driving the pump (not shown), and the liquid is fed to the separating tank (not shown), wherein the machine oil is separated from the cutting liquid. The machine oil is recovered by suitable means and the cutting liquid is used again upon being returned to the tank 15.

By making the amount of liquid which flows into the liquid reservoir 5 over the upper edge of the damming outer circumferential wall 9 greater than the amount of liquid discharged from the liquid discharge pipe 13, the amount of liquid which collects in the liquid reservoir 5 gradually increases, the flexible member 2 is extended and the float 4 lifts, whereby the upper edge of the damming outer circumferential wall 9 rises above the liquid level 16a to cut off the inflow of surface liquid to the interior of the liquid reservoir 5.

If the discharge of surface liquid from the liquid discharge pipe 13 by driving the pump is continued under these conditions, the amount of surface liquid collected in the liquid reservoir 5 decreases and the float 4 descends owing to contraction of the flexible member 2. As a result, the upper edge of the damming outer circumferential wall 9 sinks slightly below the liquid level 16a so that the surface liquid again flows into the liquid reservoir 5.

The discharge of surface liquid is carried out by repeating the foregoing operation, with the upper edge of the damming outer circumferential wall 9 moving above and below the liquid level 16a. This makes it possible solely for the surface liquid to flow into the liquid reservoir 5. In addition, the arrangement is such that the upper and lower end portions of the flexible member 2 comprising the bellows cylinder are liquid-tightly affixed to the outer peripheral portions of the base 1 and float 4, respectively, so that the cutting liquid inside the tank 15 will not leak into the liquid reservoir 5 from these liquid-tight joints. Accordingly, the mixture ratio of cutting liquid to machine oil of the liquid which flows into the liquid reservoir 5 can be made small, and the surface liquid containing a large quantity of machine oil can be discharged from the tank 15 in an efficient manner.

Figure 3:
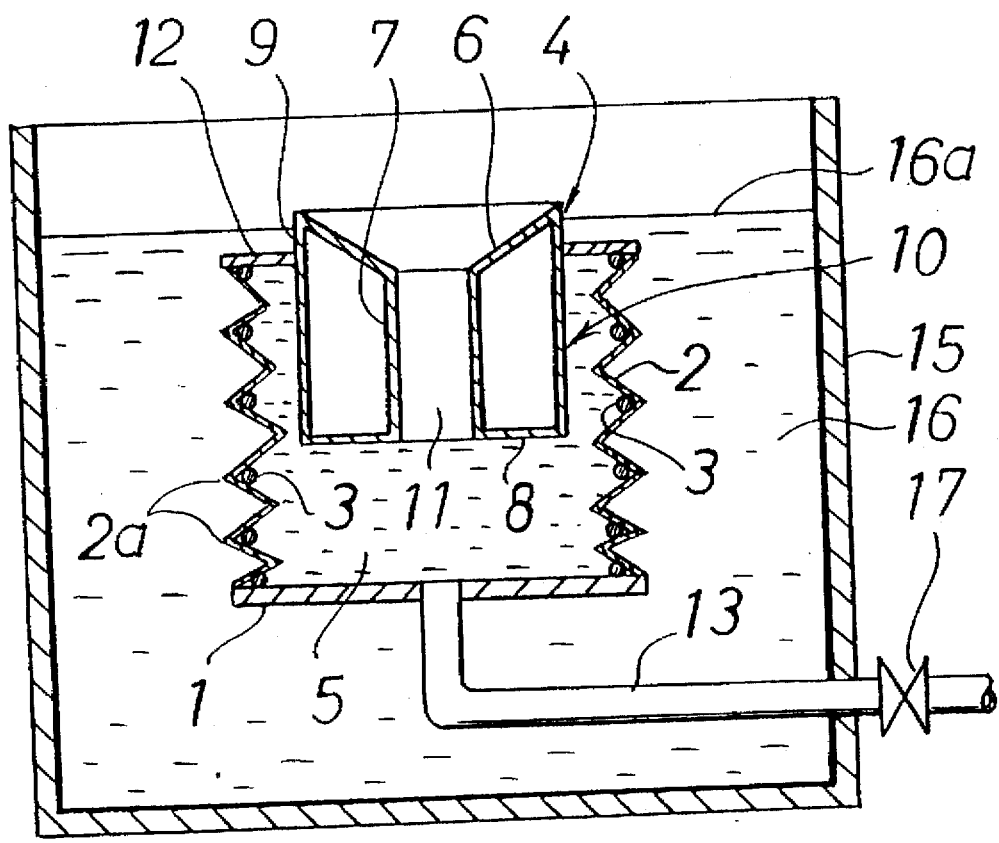
FIG. 3 is a longitudinal sectional view illustrating a second embodiment of a surface-liquid discharge apparatus according to the present invention.

FIG. 3 illustrates a second embodiment of the present invention. In this embodiment, the upper end of the liquid discharge pipe 13, which extends downwardly from and penetrates the base 1, is opened to the lower end of the liquid reservoir 5, and the liquid discharge pipe 13 is provided with a switching valve 17 comprising a solenoid valve or the like. In other aspects this embodiment is similar to the first embodiment except for the fact that the liquid separating tank (not shown) is connected to the downstream side of the switching valve 17.

By opening the switch valve 17, the liquid inside the liquid reservoir 5 is discharged to the exterior of the tank 15 by natural down flow within the liquid discharge pipe 13, whereby the liquid is introduced to the liquid separating tank. In other aspects, operation is the same as that described earlier in connection with the first embodiment.

Figure 4:
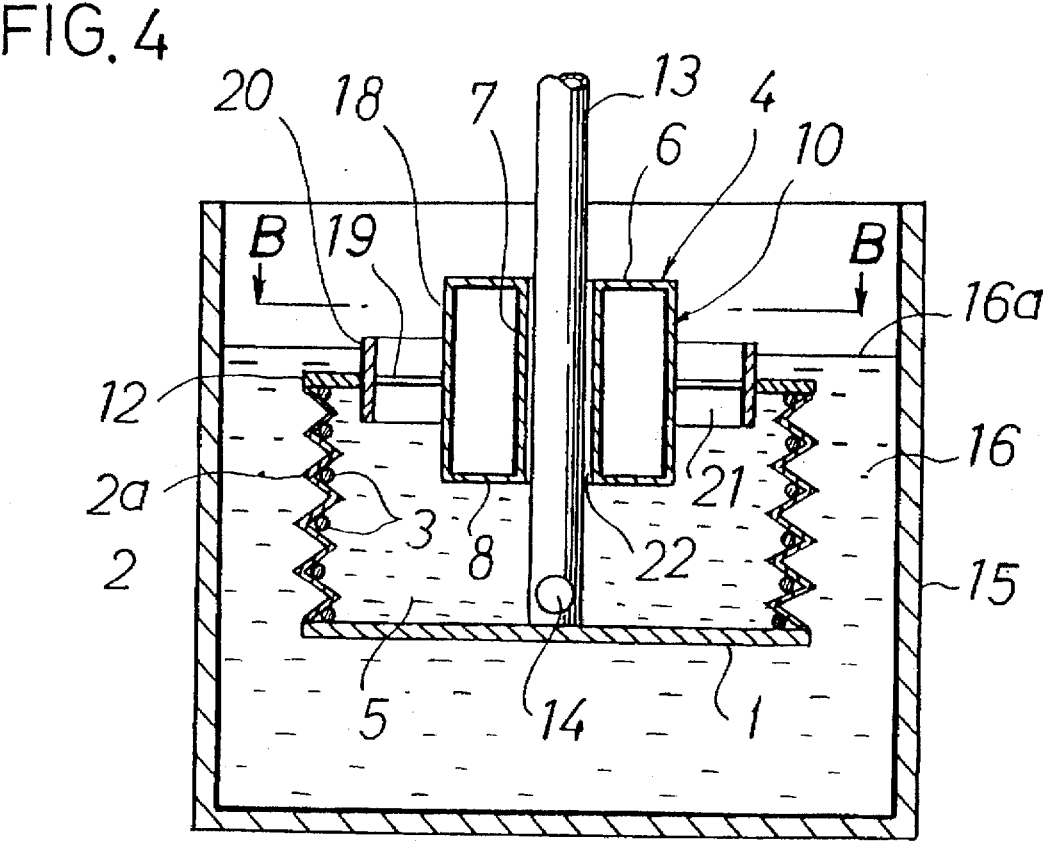
FIG. 4 is a longitudinal sectional view illustrating a third embodiment of a surface-liquid discharge apparatus according to the present invention.
Figure 5:
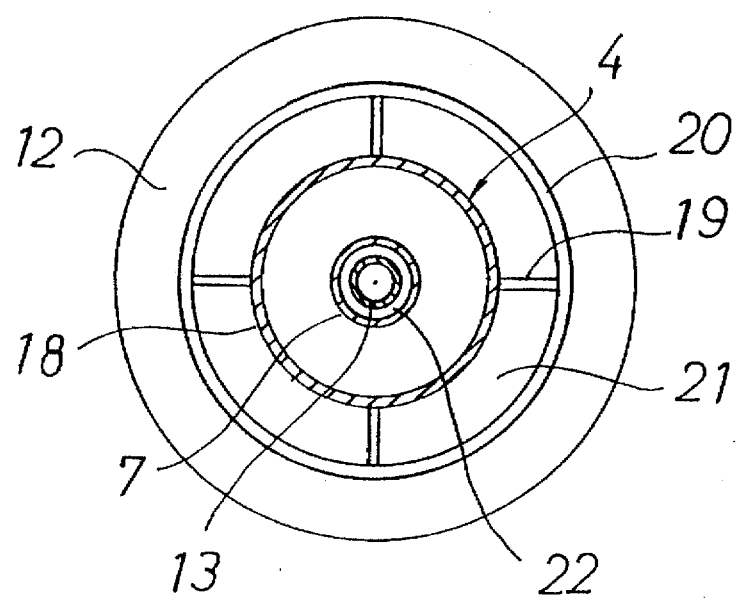
FIG. 5 is a sectional view taken along line B—B of FIG. 4.

FIGS. 4 and 5 illustrate a third embodiment of the present invention. This embodiment has a construction similar to that of the first embodiment, the only difference being a modification of the float 4. The float 4 according to the third embodiment has a float body 10 the upper wall 6 of which is horizontal, and which includes an outer circumferential wall 18 that does not serve as a damming plate. The outer side of the outer circumferential wall 18 is provided with radially extending support members 19. An annular damming plate 20 is fixedly supported on the outer ends of the support members 19 so as to be spaced away from the float body 10, whereby a liquid inlet port 21 is formed between the float body 10 and the damming plate 20. The mounting ring 12 is fixedly secured to the outer circumferential surface of the damming plate 20, and the liquid discharge pipe 13 is passed loosely through a center hole 22 defined at the center of the inner circumferential wall 7 of the float body 10.

The upper wall 6 of the float body 10 is situated above the liquid level 16a at all times, and the damming plate 20 is disposed in such a manner that its upper edge is capable of moving above and below the liquid level 16a at a position lower than that of the upper wall 6. The upper end portion of the flexible member 2 comprising the bellows cylinder is fixedly secured to the mounting ring 12.

The upper edge of the damming plate 20 is moved above and below the liquid level 16a by the rise and fall of the float 4. When the upper edge of the damming plate 20 is situated below the liquid level 16a, the surface liquid flows into the liquid reservoir 5 through the liquid inlet port 21. Operation is the same as in the first embodiment is all other aspects.

In the third embodiment, the liquid discharge pipe may be passed through the base and its upper end may be opened to the interior of the liquid reservoir in a manner similar to that illustrated in the second embodiment. In such case, the float 4 may comprise a hollow body devoid of an inner circumferential wall.

Figure 6:
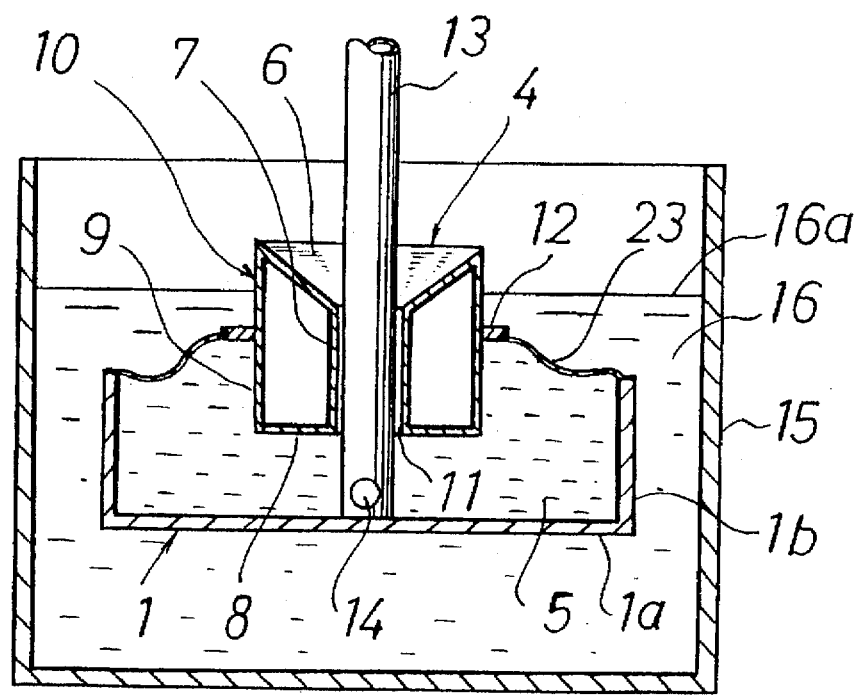
FIG. 6 is a longitudinal sectional view illustrating a fourth embodiment of a surface-liquid discharge apparatus according to the present invention.

FIG. 6 shows a sixth embodiment of the present invention. In this embodiment, the base 1 includes a bottom plate 1a and an upwardly projecting circumferential wall 1b provided on the outer circumferential portion of the base plate 1a. A flexible member 23, which comprises a diaphragm, has an edge portion on its inner circumferential side affixed to the mounting ring 12, which is provided on the outer circumferential surface of the float body 10. The flexible member 23 also has an edge portion on its outer circumferential side affixed to the upper edge of the circumferential wall 1b of base 1. The remaining construction is similar to that of the first embodiment.

Figure 7:
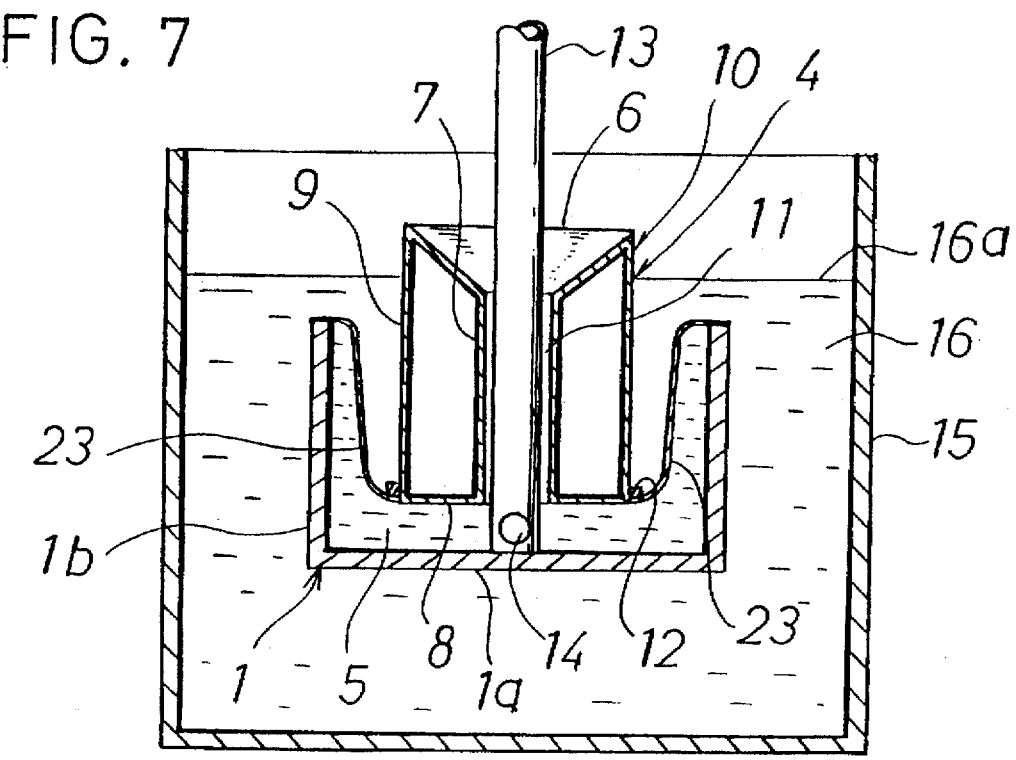
FIG. 7 is a longitudinal sectional view illustrating a fifth embodiment of a surface-liquid discharge apparatus according to the present invention.

FIG. 7 depicts a fifth embodiment of the present invention. In this embodiment, the inner circumferential edge portion of the flexible member 23 comprising the diaphragm is affixed to the lower end of the float body 10 on the outer circumferential surface thereof via the mounting ring 23, the edge portion on the outer circumferential side of the flexible member 23 is affixed to the upper edge of the circumferential wall 1b of the base 1, the height of the circumferential wall 1b is raised and the gap between the circumferential wall 1b and the outer circumferential surface of the float body 10 is reduced. The remaining construction is similar to that of the fourth embodiment.

The fourth and fifth embodiments operate in the same manner as the first embodiment. In the fourth and fifth embodiments, the liquid discharge pipe may be passed through the base and its upper end may be opened to the interior of the liquid reservoir in a manner similar to that illustrated in the second embodiment.

FIGS. 8 and 9 respectively illustrate sixth and seventh embodiments of the present invention. A plurality of vanes 24 are secured to the base 1 in the sixth embodiment and to the mounting ring 12 in the seventh embodiment. In both of these embodiments, a motor 25 is provided on the tank 15, for example, and the liquid discharge pipe 13 is driven by the motor 25 via a transmission mechanism 26 to rotate the apparatus at a speed of 100~500 rpm so that a whirlpool directed downward from the liquid surface will be produced in the liquid by the vane 24. As a result, the machine oil which floats on the surface portion of a cutting liquid or the like rapidly gathers near the outer periphery of the apparatus so that a thick layer of the machine oil forms. This causes the machine oil or the like to flow into the liquid reservoir 5 efficiently in a short period of time. Other elements of the construction and operation described in the seventh embodiment are the same as in the first embodiment.

Though not illustrated, the base or the mounting plate of the third embodiment may be provided with vanes in the same manner as the sixth or seventh embodiment, and a motor or the like for rotating the vanes also may be provided. Further, the outer peripheral surface of the circumferential wall on the base of the fourth and fifth embodiments may be provided with vanes at suitable locations, as in the sixth or seventh embodiment, and a motor or the like may be provided to rotate the vanes.

In FIGS. 3 through 9, reference numerals identical to those of the first embodiment shown in FIGS. 1 and 2 designate corresponding structural elements.

In accordance with the present invention, the rings or coil spring attached to the flexible member comprising the bellows cylinder may be deleted, and a stopper for setting the positions of ascent and descent of the float may be provided on a stationary member such as the tank or base. However, the stopper also may be dispensed with if desired.

In the present invention, the first and second embodiments are such that the height of the float will be substantially flush with the minimum liquid level. Therefore, the height of the flexible member comprising the bellows cylinder can readily be made three to five times that of the float, though this will depend upon the thickness of the material constituting the flexible member, the difference between its inner and outer diameters, etc. This makes it possible to deal with a large vertical fluctuation in the liquid level.

According to the present invention, the arrangement in which the surface liquid is discharged from the liquid reservoir through the liquid discharge pipe by means of the pump is such that the amount of the surface liquid discharged from the liquid reservoir is capable of being regulated by varying the rotational speed of the pump. In the arrangement in which the surface liquid is discharged from the liquid reservoir through the liquid discharge pipe, the amount of the surface liquid discharged from the liquid reservoir is capable of being regulated by a flow control valve provided in the liquid discharge pipe.

In the present invention, the vanes of the seventh embodiment may be replaced by crushing member such as cutting blades or projections provided on the outer circumferential surface of the base. By rotating the crushing members together with the apparatus through use of a motor, lard-like contaminants which form on the surface of the liquid are caused to disintegrate so that the resulting fragments may flow into the liquid reservoir along with the surface liquid.

Figure 10:
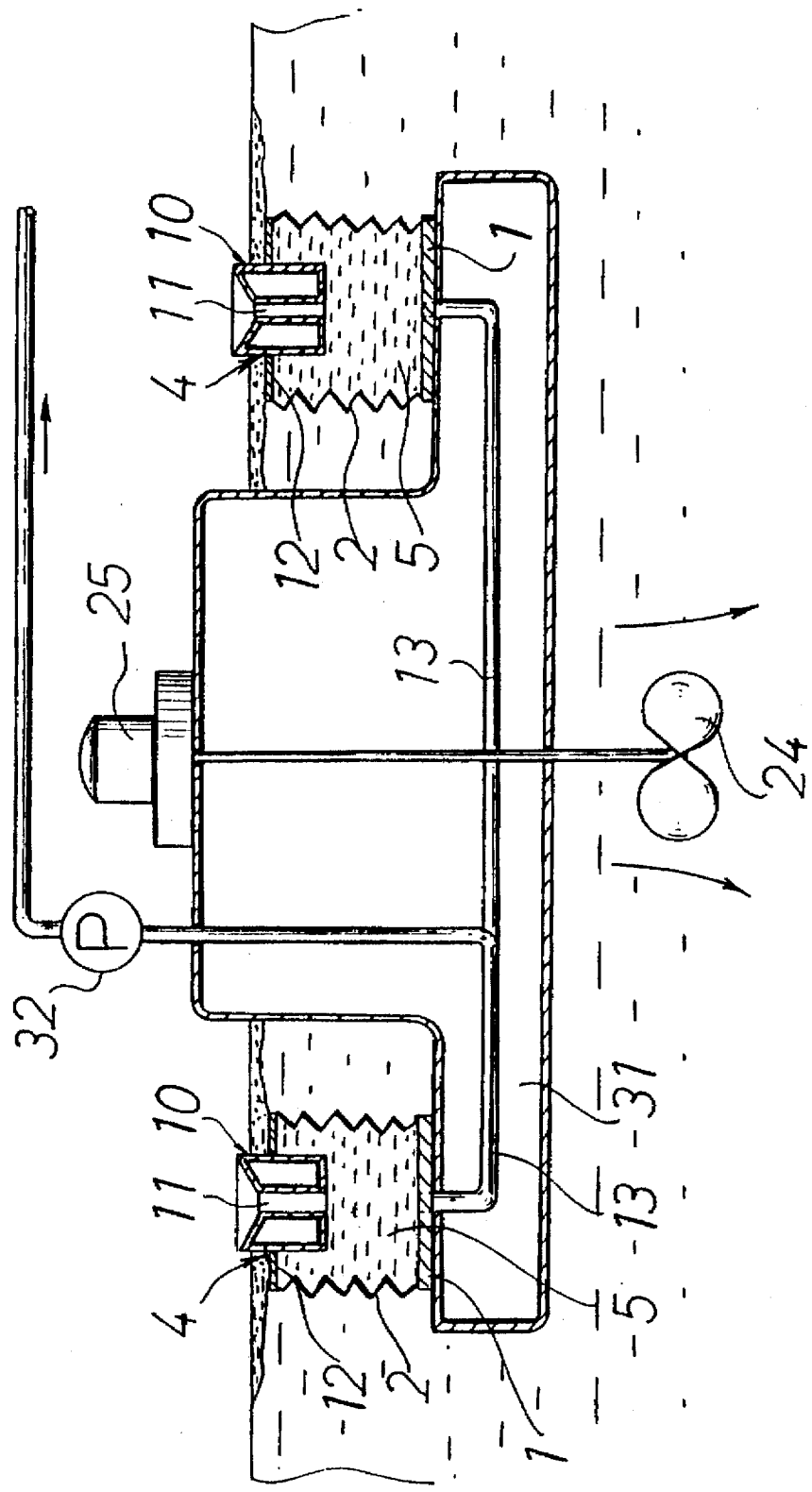
FIG. 10 is a schematic sectional view illustrating an eighth embodiment of a surface-liquid discharge apparatus according to the present invention.

The foregoing embodiments relate to an apparatus for discharging machine oil which floats on the cutting liquid of a machine tool. However, the present invention is broadly applicable to discharge and removal of oil floating on a liquid such as water, particularly the discharge of surface liquids that are the source of contamination. An example of such apparatus is an apparatus for discharging and removing oil, such as waste oil or crude oil, that has flowed out into sea water. In order to remove waste oil or the like that has been released into sea water, use is made of a surface-liquid discharge apparatus according to an eight embodiment illustrated in FIG. 10.

In the eighth embodiment, a large-size flotation body 31 floats on sea water (the liquid in this embodiment), the flotation body 31 is provided with a motor 25 and pump 32 situated above the level of the sea water at all times, and a plurality of the surface-liquid discharge apparatus of the first embodiment are arrayed on the outer circumferential portion of the flotation body 31, this portion having a comparatively small height. The base 1 of each apparatus is fixed to the flotation body 31. By rotating a blade 24 driven by the motor 25, a downwardly directed water flow is produced so that waste oil or released crude oil floating on the surface of the sea water will flow into the reservoir 5 of each surface-liquid discharge apparatus. The oil which collects in the reservoir 5 is discharged to a suitable location on land or on ship by driving the pump 32.

The construction and operation of the above-described discharge apparatus are substantially the same as in the first embodiment. However, the liquid discharge pipe 13 of each discharge apparatus is connected to the single pump 32, and each discharge apparatus may be held by suitable means outside the flotation body 31.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for discharging a surface liquid, comprising:

a base arranged in a liquid and having an outer peripheral portion;

a flexible member having a first end, which is fixed to said base at the outer peripheral portion thereof, and a second end, said flexible member being exposed laterally to the liquid environment external to said apparatus;

a float disposed above said base and having an outer peripheral portion;

a damming plate, provided on and surrounding the outer peripheral portion of said float, for being moved above and below the level of the liquid by ascent and descent of said float, said damming plate being fixed to the second end of said flexible member;

a liquid reservoir formed in a space delimited by said base, said flexible member and said damming plate, for receiving surface liquid, said float buoyantly supported by the liquid in said reservoir;

a liquid inlet between said float and said damming plate for entry into said reservoir of liquid flowing over the top of said damming plate; and a liquid discharge pipe open to the interior of said liquid reservoir for discharging the surface liquid received in said liquid reservoir to the exterior of the liquid.

2. The apparatus according to claim 1, wherein said flexible member is a bellows cylinder.

3. The apparatus according to claim 1, wherein said flexible member is a diaphragm.

* * * * *